Dec. 15, 1959 J. M. THORSÉN 2,917,717

MODULATOR FOR AMPLITUDE MODULATING A PULSE TRAIN

Filed Jan. 19, 1956 2 Sheets-Sheet 1

INVENTOR
JARL MORANNAR THORSÉN
BY Hane and Nydick
ATTORNEYS

INVENTOR
JARL MORANNAR THORSÉN
BY Hane and Nydick
ATTORNEYS

United States Patent Office 2,917,717

Patented Dec. 15, 1959

2,917,717

MODULATOR FOR AMPLITUDE MODULATING A PULSE TRAIN

Jarl Morannar Thorsén, Hagersten, Sweden, assignor to Telefonaktiebolaget L M Ericsson, Stockholm, Sweden, a corporation of Sweden Application January 19, 1956, Serial No. 560,241

Claims priority, application Sweden February 4, 1955

5 Claims. (Cl. 332—15)

The present invention relates to a modulator for amplitude modulation of a pulse train.

In pulse amplitude modulation systems it is previously known to superimpose a modulating voltage on an un-modulated pulse train. This may be effected by supplying a pulse train as well as a modulation voltage to the control grid in an electron tube, i.e. additive conversion. In this case the cut-off voltage of the tube is used in such a way, that the part of the pulse only which is above said cut-off voltage (clipping level) is taken out and used. A pulse train and a modulation voltage can also be fed to different grids but the cut-off voltage of the tube, i.e. multiplicative conversion, is still used, and the part of the pulse peak which is above said cut-off voltage, is utilized. In both these cases it is, thus, possible to make use of a great or small part of the pulse peak, that is the part of the amplitude modulated pulses which is above said cut-off voltage or clipping level. In both cases, however, the very peak of the pulse as well as the time phases of the edges of the pulse will follow the variations of the modulation voltage.

In the amplitude modulation system according to the invention, the clipping level varies in accordance with the modulation voltage, and the part of the pulse which is above said clipping level is cut off and only that part of the pulse which is below the clipping level is taken out and used. The advantages of this system are: It is insensitive to variations in the amplitude of the applied, un-modulated pulses, if said amplitude only exceeds a certain determined level and the time positions of the pulse edges will not follow the variations of the modulation voltage. This makes possible a transmission of an amplitude modulated and a time modulated channel on the same pulse train without the risk of cross talk from the amplitude modulated channel to the time modulated channel.

Figure 1:
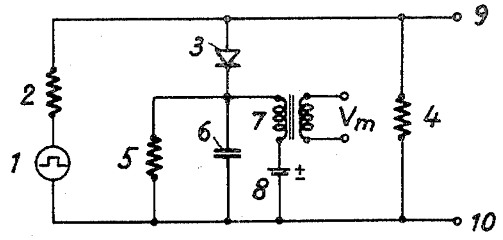
Figure 2:
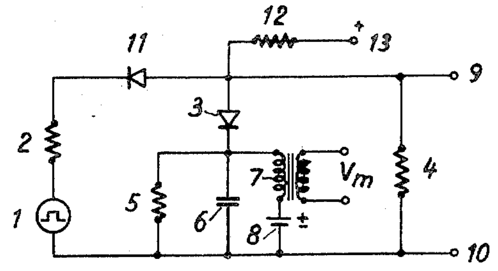
Figure 3:
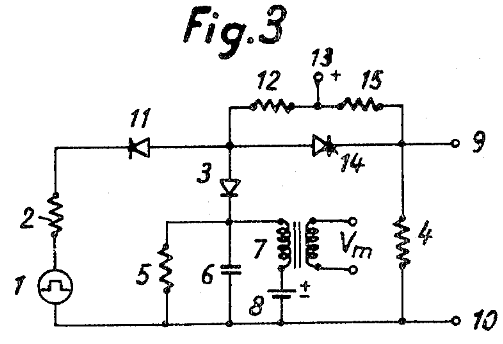
Figure 4:
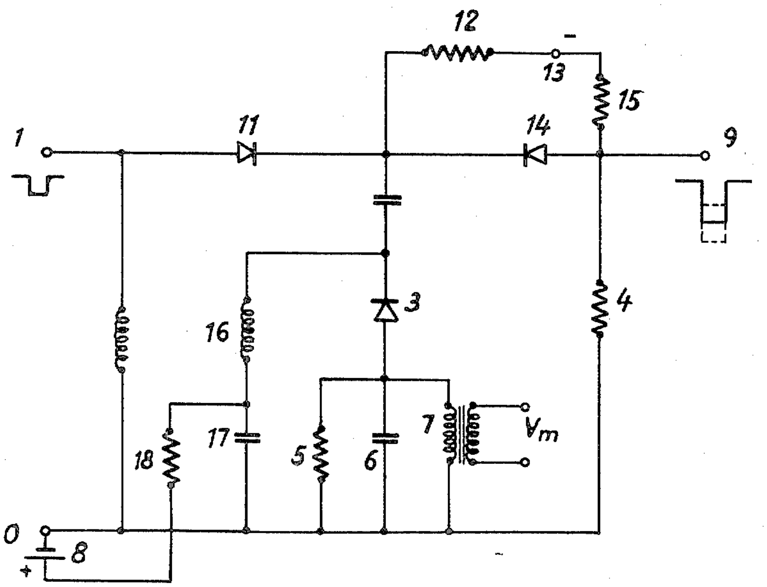

The invention will now be described more in detail in connection with the attached drawings, in which Figs. 1 and 2 show two variations of a modulator according to the invention, and Figs. 3 and 4 show two modified embodiments more suitable for practical use.

In Fig. 1, 1 designates a pulse generator for producing positive pulses, the inner resistance of the generator being designated by 2. A load impedance 4 is connected to the pulse generator. An amplitude limiter comprising a diode 3 in series with a condenser 6 is connected in parallel through said load impedance. Connected in parallel through the condenser are as well a resistance 5 as a bias voltage source 8 in series with one of the windings of a transformer 7, the other winding of which is fed with a modulation voltage $V_m$. The diode is non-conductive during the time between the pulses, but will be conductive during the duration of the pulse. If the condenser 6 is large enough, the charge supplied to the condenser by the pulse does not have time to alter the bias voltage over the condenser during the duration of the pulse, i.e. the amplitude of the pulse is limited. A series of amplitude modulated pulses is obtained between the output terminals 9 and 10 of the device, the peaks of said pulses being cut off at a level which follows the variations of the supplied modulation voltage. A similar device is shown in Fig. 2, the only difference being that another diode 11 has been connected between the pulse generator and the diode 3. A bias voltage source 13 is through a resistance 12 connected to the connection point between the two diodes. The bias voltage is so chosen that the diode 11 is conductive and the diode 3 blocked during the interval between the pulses. When a pulse appears, the diode 3 will, however, be conductive and the diode 11 will be blocked. The two described devices are suitable for use in single-channel systems only. In multi-channel systems a plurality of outputs of such devices are to be connected in parallel, and with an embodiment according to Figs. 1 and 2 a mutual interference between the different channels would occur. In order to prevent this another diode 14 has been placed between the load impedance 4 and the diode 3, as shown in Fig. 3. The diode 14 is connected in parallel with two resistances 12 and 15 which are connected in series, a bias voltage source 13 being connected to the connection point of said resistances. Interference between the different channels is prevented by arranging the bias voltage on said third diode 14 in such a way that said diode is non-conductive between the pulses but conductive during the duration of the pulses, and that it is conductive at a lower pulse amplitude than the diode 3. The device is, thus, suitable for use in multi-channel systems. The above described devices have been fed with positive pulses. It is, of course, also possible to supply negative pulses to the device, if only all diodes and all bias voltages change polarity.

Fig. 4 shows a practical embodiment of the device according to the invention. It is fundamentally built up in the same manner as in Fig. 3, only with that difference that negative pulses instead of positive ones are supplied to the device, and that the bias voltage to the diode 3 is supplied in another way.

If the bias voltage source 8 is common to different channel modulators, the inner resistance of said bias voltage source should, in a device according to Fig. 3, be 10,000 times smaller than the impedance of the secondary of the transformer 7 for modulation frequencies if a cross-talk attenuation of 10,000 times is to be obtained. This is difficult to obtain in practice, and, therefore, the diode 3 in the device according to Fig. 4 has been connected to the bias voltage source 8 in a way more suitable from a cross-talk point of view. Between the modulation voltage source and the bias voltage source there is an L-link which attenuates the modulation voltage and the series branch of which consists of the normally non-conductive diode 3 in series with a choke 16, and the shunt branch of which consists of the condenser 17, the reactance for modulation frequencies of which is very small in relation to the back resistance of the diode 3. Thus, only a small fraction of the modulation voltage appears across the condenser 17. This fraction is again attenuated by an L-link, the series branch of which consists of the resistance 18, and the shunt branch of which consists of the inner resistance of the bias voltage source 8. Another reduction of the cross talk is also obtained by the fact that the modulation voltage which appears across the bias voltage source 8 and which is practically attenuated, is further attenuated by the L-link in the modulator, the series branch of said L-link consisting of the resistance 18 and the shunt branch of said L-link consisting of the condenser 17.

The invention is naturally not limited to the embodiments shown in the drawings, but a plurality of different detail embodiments may be possible within the scope of the invention.

I claim:

1. A modulator for amplitude modulating a pulse train, comprising, in combination, a pulse generator, a load impedance connected in a feed circuit with said generator, pulse amplitude limiting means including a first diode and a capacitance means connected in series with each other and in parallel with said load impedance, a first source of a bias voltage connected to said diode for blocking the same in the pulse intervals, a source of a modulation voltage connected to said diode for varying the potential at one end of the electrodes thereof, the capacitance of said capacitance means limiting the pulse amplitude and precluding a material change in the voltage across said capacitance means in response to the charge supplied by a pulse to the capacitance means during the duration of a pulse, a second diode connected between said pulse generator and said first diode, a second source of a bias voltage connected to said second diode for rendering the latter conductive in the pulse intervals and blocking the same during the pulses, a third diode connected between said load impedance and the connection point between the first diode and the second diode, said third diode being biased to be blocked in the pulse intervals and to be conductive during pulses at a lower pulse amplitude than said first diode, and an attenuating L-link circuit having a series branch connected between said source of modulation voltage and one terminal of said first source of bias voltage and including said first diode and a choke and a shunt branch connected between said source of modulation voltage and the other terminal of said source of bias voltage and including a capacitance means.

2. A modulator according to claim 1 and further comprising a transformer means having one winding connected in parallel with the capacitance means of said amplitude limiting means, the other winding of said transformer means being connected to said source of modulation voltage.

3. A modulator according to claim 1 and further comprising two resistance means connected in series with each other and across the electrodes of said third diode, said second source of a bias voltage being connected to the connection point between said two resistance means.

4. A modulator according to claim 1 wherein a resistance means is connected between said first source of bias voltage and the connection between the capacitance means in the shunt branch and said choke.

5. A modulator according to claim 1 wherein the capacitance means in the shunt branch has a reactance for modulation frequency which is small in relation to the back resistance of said first diode whereby only a small fraction of the modulation voltage appears across said capacitance means.

References Cited in the file of this patent

UNITED STATES PATENTS

| | | |
|---|---|---|
| 2,645,680 | Reeves | July 14, 1953 |
| 2,657,318 | Rack | Oct. 27, 1953 |
| 2,716,731 | Flowers et al. | Aug. 30, 1955 |
| 2,760,160 | Flood et al. | Aug. 21, 1956 |